United States Patent [19]
White

[11] Patent Number: 5,827,787
[45] Date of Patent: Oct. 27, 1998

[54] DECORATIVE WEATHERABLE FABRIC

[75] Inventor: William Wilson White, Mooresville, N.C.

[73] Assignee: John Boyle & Company, Inc., Statesville, N.C.

[21] Appl. No.: 769,709

[22] Filed: Dec. 18, 1996

Related U.S. Application Data

[60] Provisional application No. 60/017,749 May 5, 1996.
[51] Int. Cl.$^6$ .................................................. B32B 7/00
[52] U.S. Cl. ............................... 442/38; 442/40; 442/41; 442/45; 442/46; 442/58; 156/182; 156/327
[58] Field of Search ................................ 442/38, 40, 41, 442/45, 46, 58; 427/182, 327

[56] References Cited

U.S. PATENT DOCUMENTS

| | | |
|---|---|---|
| 5,108,836 | 4/1992 | Ocampo et al. . |
| 5,209,029 | 5/1993 | Foerst . |
| 5,422,189 | 6/1995 | Warner et al. ............................ 428/480 |
| 5,667,618 | 9/1997 | Lowther ................................... 156/249 |

OTHER PUBLICATIONS

DuPont Company, *DuPont Tedlar® PVF Film helps keep outdoor vinyl fabrics looking newer longer . . .*
Advanced Vinyl, Inc. *Awning Covers by Avi,* Copyright 1988 AVI.

DuPont Company, *DuPont Tedlar® polyvinyl fluoride film,* Mar. 1995.

DuPont Company, *DuPont Tedlar® PVF Film One Solution For Unlimited Applications,* Dec. 1995.

*Primary Examiner*—Christopher Raimund
*Attorney, Agent, or Firm*—Bell Seltzer Intellectual Property Law Group of Alston & Bird, LLP

[57] ABSTRACT

A decorative and translucent weatherable fabric for covering outdoor backlit structures is provided which includes a reinforcing scrim layer, an inner protective layer formed of a translucent white PVC applied to one side of the scrim layer, and a thicker substrate layer applied to the opposite side of the scrim layer. The substrate is also preferably a substantially translucent white PVC polymer. In one embodiment of the fabric for use with a reader panel of the awning, an outer transparent layer is adhered to the substrate layer and has UV resistant properties. A weatherable pressure sensitive decorative film is applied to certain portions of the transparent layer in a predetermined graphical pattern to create a foreground image. A second pressure sensitive decorative film may be applied to certain other portions to create a background image of a different color.

31 Claims, 1 Drawing Sheet

DECORATIVE WEATHERABLE FABRIC

CROSS-REFERENCE TO RELATED APPLICATION

This application claims the benefit of U.S. Provisional application Ser. No. 60/017,749, filed May 15, 1996.

FIELD OF THE INVENTION

The present invention relates to weatherable fabrics, and more particularly relates to decorative weatherable fabrics which may be used for covering backlit awnings and the like.

BACKGROUND OF THE INVENTION

There are many uses for weatherable outdoor fabrics. For example, one use for such fabrics is for covering awnings or canopies of the type which are commonly used over storefronts, patios, doorways, etc. These fabrics may be used in other situations, however, such as for signs and billboards or as covers for outdoor equipment where a decorative but weatherable fabric is desired.

Awnings and canopies typically include a rigid structural frame which is fastened to an exterior wall. A flexible fabric is then placed over the frame, pulled tight and secured to the frame. The fabric is preferably waterproof to provide shelter from rain or snow and is also typically substantially opaque in the daytime to provide protection from the sun.

In addition to protecting persons thereunder from the elements, awnings may also be used as a form of signage and include graphics visible thereon. In particular, such awnings typically include a background color over most or all of the visible surface of the fabric. The structural members of the frame typically define a plurality of panels and one or more of these panels may be "reader panels" which include the desired graphical material.

The reader panel will typically include a background color which matches the color of the surrounding panels and a different foreground color which constitutes the graphical material. For example, the name and logo of the business may be in the foreground in a lighter color, with the darker color surrounding the lighter areas and comprising the background. The background color of the reader panel preferably matches the color of the adjacent panels.

Awnings and canopies of this type may be "backlit" for an especially striking visual effect. In particular, an array of artificial lights is placed behind and underneath the awning so as to illuminate the awning at night. As such, it is desirable that the awning fabric be generally translucent so that light from the backlighting is diffused but can be seen from the opposite side of the awning fabric. The graphics are often in lighter colors so as to be easily legible in contrast to surrounding darker colors. The background colors of the reader panel should match the colors of the surrounding panels when backlit so that the panels appear the same whether viewed with natural sunlight from the front or with artificial lights from behind the awning.

Conventional fabrics for backlit awnings typically include a scrim layer such as a woven polyester fabric for strength reinforcement. Applied to both sides of the scrim layer, such as by lamination, is a layer of polyvinylchloride (PVC) for sealing out water which might rot the fabric. One exemplary commercially available awning fabric of this type is sold under the name Starlit® by John Boyle & Co., Inc., who is the assignee of the present invention.

The underside PVC layer, i.e., the layer facing the backlighting, may be formed of a translucent white PVC polymer. The PVC layer applied to the opposite side of the scrim layer includes pigments which provide the desired decorative color on the outer surface of the awning. Overlying the decorative PVC layer is a transparent PVC layer and adhered thereto is a transparent weather resistant layer.

Awning fabrics generally must be resistant to the harmful effects which can be caused by the elements. Accordingly, the outermost layer must be highly weatherable and resistant to chemical attack and/or water staining. It is also desirable that the weather resistant layer have a self-cleaning effect so that its initial appearance can be maintained.

The effects of the sun can be especially harmful and, because the colored PVC layer is not fully resistant to degradation by ultraviolet radiation, the weatherable transparent layer includes UV-absorbing additives to prevent damaging rays from reaching the colored PVC. These UV-absorbing additives may break down over time, however, which can result in degradation of the colored PVC. Polyvinylfluoride (PVF) films are a preferred type of transparent weatherable film which may be used for the outermost layer. In particular, a type of extruded PVF film known as UT Tedlar® film, which is a product of the DuPont Company, Inc., has proven effective for this purpose.

Graphical matter can be applied to the reader panel of awnings in one of several conventional ways. For example, the graphics can be painted on the outer surface of the reader panel with conventional techniques. However, such painted graphics are not protected from UV radiation.

Alternatively, the graphics can be applied directly onto either the colored or transparent PVC layers before application of the overlying layer(s) so that the graphics will be protected by the weatherable outer PVF film. However, with regard to applying the graphics to the transparent PVC layer, the PVF film is not easily adhered to PVC and the process typically includes using a flammable solvent adhesive. As such, special equipment is required which can make the application of PVF films to PVC reader panels having unique graphical matter applied thereto economically inefficient.

An alternative approach is to manufacture bulk quantities of PVF film adhered to a transparent PVC layer in advance of the resultant laminate's application to custom reader panels. More specifically, the PVF film is adhered to the transparent PVC layer using the special equipment mentioned above at a first bulk processing facility. The transparent material is shipped to another location where custom reader panels are prepared having the unique graphical matter applied to the colored PVC layer. The transparent PVC layer (with the PVF film adhered thereto) can then be easily applied to the colored PVC layer (and any graphics thereon) with conventional lamination techniques making the production of custom awnings economically efficient, as shown in U.S. Pat. No. 5,108,836 to Ocampo, et al. However, the preparation of reader panels with unique graphical matter conventionally requires lamination equipment making it difficult to apply graphics at the job site where the awning is to be installed.

Accordingly, there is a need for a decorative and weatherable fabric for covering awnings and the like which is resistant to UV radiation from the sun but which also can be backlit for a desirable effect at nighttime. In particular, it would be advantageous if such a fabric could have graphical matter applied when the awning is being installed so that design changes can be made to the graphics at the job site if desired. Further, such a fabric would advantageously have reader panels and adjacent nonreader panels which matched in color both when viewed in daytime under natural light and when viewed at nighttime with artificial backlighting.

SUMMARY OF THE INVENTION

These and other needs are met by the awning fabric according to the present invention which provides an improved graphics application system wherein both foreground and background colors can be easily applied to a reader panel. The foreground graphics are formed of a pressure sensitive weatherable film which can be cut and applied to a base fabric at the job site. Background colors in the form of a pressure sensitive weatherable film can be cut and fitted into the spaces around the foreground film. The base fabric advantageously provides a translucent substrate for the foreground and background colors. A fabric is also provided for nonreader panels which can exactly match in color the background portions of the reader panel, whether viewed under natural light from the front or artificial lighting from behind the awning.

The fabric includes a reinforcing scrim layer and a protective layer applied to one side of the reinforcing scrim layer. The inner protective layer is preferably formed of a water resistant polymer and is substantially translucent. In particular, the inner protective layer may be formed of a translucent white PVC polymer.

A polymeric substrate layer is applied to the opposite side of the reinforcing scrim layer. This layer is also preferably substantially translucent and may be formed of a white PVC polymer. The substrate layer is advantageously thicker than the inner protective layer to mask any roughness in the texture of the reinforcing scrim layer and enhance the outer surface smoothness of the awning fabric. In particular, the polymeric substrate layer preferably has a thickness of about 11 mils.

An outer transparent layer is adhered to the substrate layer on the side of the substrate layer opposite to the reinforcing scrim layer. The outer transparent layer preferably includes a polyvinylfluoride polymer for weatherability, and also includes UV-absorbing additives for absorbing UV rays and protecting the substrate layer. A crosslinking and hydrolytically stable solvent adhesive is applied between the polyvinylchloride substrate layer and the polyvinylfluoride transparent layer for adhering the layers together.

To achieve the desired graphical effect, a decorative film is applied to at least portions of the transparent layer in a predetermined graphical pattern. The decorative film preferably includes pigments which prevent UV rays from passing therethrough to the outer transparent layer and the substrate layer. The decorative film includes a pressure sensitive adhesive on the underside of the film so that the decorative film can be adhered to the outer transparent layer. Accordingly, the decorative film may be applied in a predetermined graphical pattern at the job site where the awning is being installed and no special equipment is needed to apply the decorative film to the awning fabric.

The decorative film exhibits a foreground color and is applied to certain portions of the transparent layer. Advantageously, a second decorative film having pigments of a different background color may be applied to certain other portions of the transparent layer to further form a predetermined graphical pattern. The second decorative film is also applied with a pressure sensitive adhesive.

According to another preferred embodiment of the invention, a decorative weatherable covering for outdoor structures is provided having both reader and nonreader panels which match in color. In particular, the covering includes a first section for exhibiting graphical matter having a substrate layer and a transparent layer adhered to the substrate layer. The transparent layer includes UV-absorbing additives for absorbing UV rays and protecting the substrate layer. A decorative layer is applied to the transparent layer in a predetermined graphical pattern. The decorative layer preferably includes a first pigmented film applied to certain portions of the transparent layer and a second pigmented film applied to certain other portions of the transparent layer.

The covering also includes a second section adjacent to the first section. The second section includes a substrate layer and an outer decorative layer applied to the substrate layer. The decorative layer includes pigments which prevent UV rays from passing therethrough to the substrate layer. Preferably, the outer decorative layer of the second section and one of the first and second pigmented films of the first section are of the same color. As such, because the translucent layers below the fabrics of each section are identical, the fabrics advantageously exhibit the same color whether viewed with natural sunlight from above or viewed as illuminated with artificial backlighting from behind the fabric. The other of the pigmented films of the first section is preferably of a different color to provide a contrasting and therefore readable graphical pattern. An edge portion of the fabric of the first section and an edge portion of the fabric of the second section are both preferably affixed to a common structural member of the outdoor structure.

Associated methods also form a part of the present invention, and include the steps of applying an inner protective layer formed of a water resistant polymer to one side of a reinforcing scrim layer and, in a separate step, adhering an outer weatherable layer to one side of a polymeric substrate layer. The outer layer preferably includes UV-absorbing additives which prevent UV rays from passing therethrough. The side of the polymeric substrate layer opposite the outer weatherable layer is then applied to the side of the reinforcing scrim layer opposite the inner protective layer. A decorative film is applied to at least portions of the transparent layer in a predetermined graphical pattern.

The adhering step preferably includes applying a crosslinking solvent adhesive between the outer weatherable layer and the polymeric substrate layer at a first physical location to adhere the layers together. The steps of applying the inner protective layer and the polymeric substrate layer to the reinforcing scrim layer include applying a plastisol adhesive between the respective layers to adhere the layers together. These applying steps may advantageously be performed at a second location separate from the first location. The step of applying a decorative film to at least portions of the transparent weatherable layer in a predetermined graphical pattern can be performed at a third location separate from the first and second locations which is advantageously performed at the job site where the awning is installed.

BRIEF DESCRIPTION OF THE DRAWINGS

Some of the objects and advantages have been stated, others will appear as the description proceeds, when taken in connection with the accompanying drawings, which are not necessarily drawn to scale.

DETAILED DESCRIPTION OF THE PREFERRED EMBODIMENTS

Figure 1:
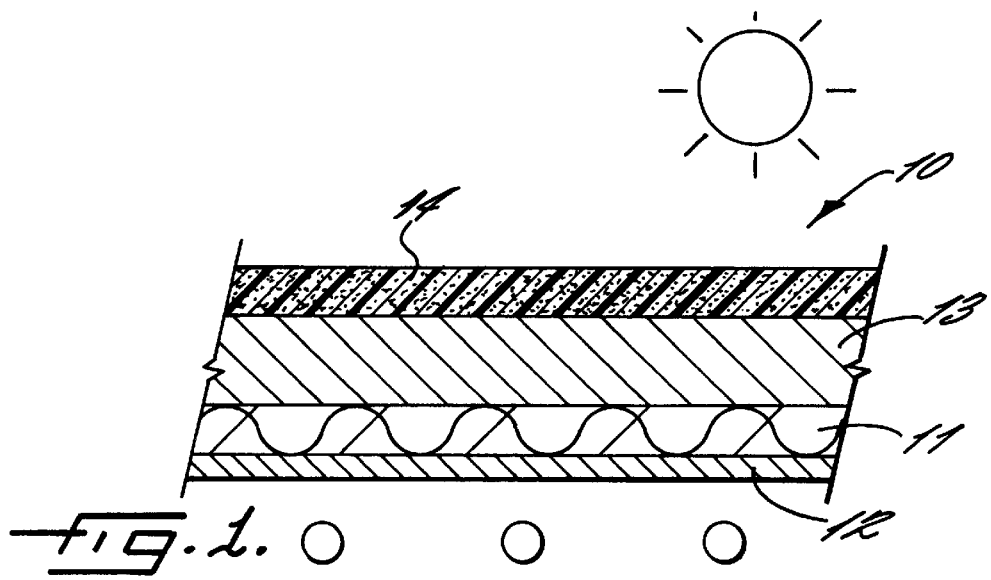
FIG. 1 is a partial sectional view of a decorative and weatherable awning fabric for nonreader panels.
Figure 2:
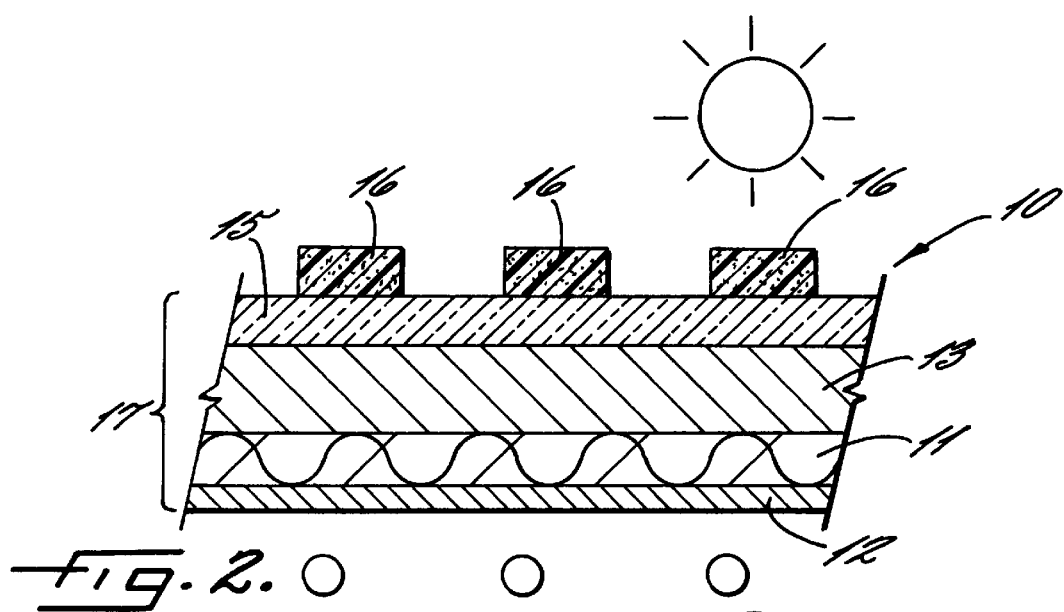
FIG. 2 is a partial sectional view of a decorative and weatherable awning fabric according to the present invention illustrating a decorative film for creating a graphical pattern.
Figure 3:
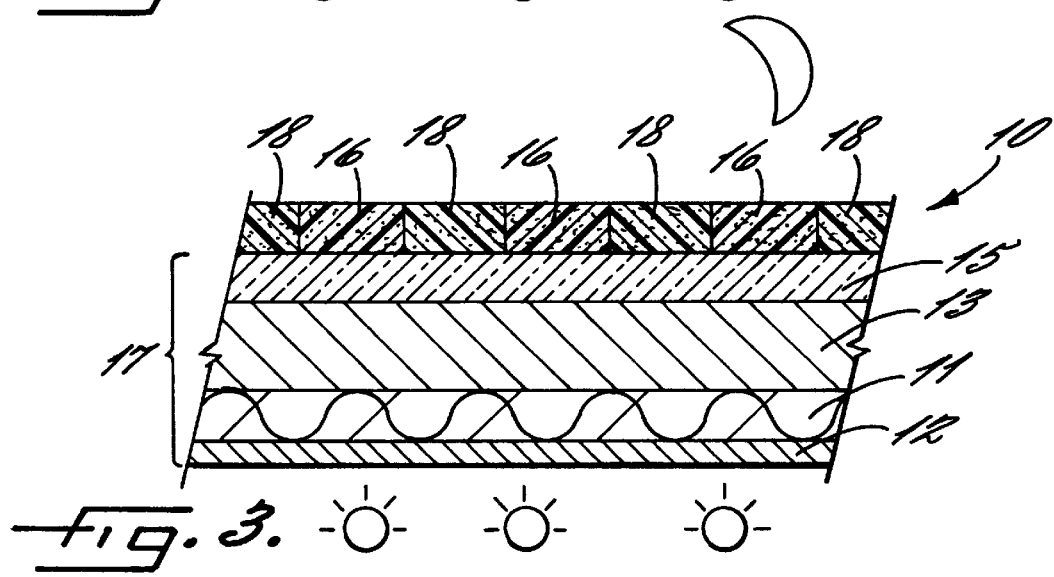
FIG. 3 is a partial sectional view of the awning fabric of FIG. 2 illustrating a second decorative film which, in conjunction with the first decorative film, creates a graphical pattern.

The new weatherable fabric 10 according to the present invention is illustrated in FIGS. 1–3 and includes a reinforcing scrim layer 11, which may be formed of a woven polyester fabric. Applied to one side of the reinforcing scrim layer is an inner protective layer 12. The inner protective layer 12 is formed of a water resistant polymer and prevents rainwater from coming into contact with the reinforcing scrim layer 11 which could cause the scrim layer to rot. In particular, the inner protective layer 12 is preferably formed of a polyvinylchloride polymer which is generally translucent and white in color. As used herein, the term "translucent," when used in connection with an element of the invention, is intended to mean that the element lets light (such as backlighting) pass therethrough but also diffuses the light so that objects on the other side of the element from the viewer cannot be clearly distinguished. The inner protective layer 12 is preferably applied to the reinforcing scrim layer 11 with a plastisol adhesive using conventional lamination techniques.

Applied to the opposite side of the reinforcing scrim layer 12 is a polymeric substrate layer 13. The polymeric substrate layer 13 is preferably also formed of a PVC polymer which is translucent and white in color and may also be laminated to the reinforcing scrim layer 11 with a plastisol adhesive. The polymeric substrate layer 13 is thicker than the inner protective layer 12 and masks the rough texture of the reinforcing scrim layer 11 to provide a smoother finish on the outer surface of the fabric 10. In particular, the polymeric substrate layer 13 preferably has a thickness of about 11 mils. Thus, an advantageous substrate fabric is provided and may be used as a base for any of the particular embodiments discussed below.

FIG. 1 illustrates a fabric construction which is especially useful for the "nonreader" panels to which graphical material is not applied. (As used herein, the terms "graphic" or "graphical" are intended to cover all graphical and textual design or other visible indicia including, for example, the name and/or logo of a business.) Adhered to the side of the polymeric substrate layer 12 opposite the reinforcing scrim layer 11 is an outer decorative layer 14. The outer decorative layer 14 may be colored to provide the desired decorative outer appearance for the awning fabric. (As used herein, the term "decorative" is intended to describe anything which causes a decorative appearance, such as solid colors including black, white, primary colors or combinations thereof.)

In particular, the outer decorative layer 14 is weatherable and is preferably formed of a PVF polymer including pigments dispersed throughout the thickness of the layer. One preferred material for this purpose is SP Tedlar® PVF film, which is a product of the DuPont Company, Inc. The pigments block UV radiation and, because the UV rays are blocked and not merely absorbed, the UV protection will not break down substantially over time. The film is preferably formed by a casting process which eliminates problems with dimensional instability and curling associated with extruded films. In addition, the casting process provides a more uniform color than an extrusion process which is especially advantageous for use with the translucent films of the present invention, where color inconsistencies are very evident when viewed with backlighting. Other possible films include Fluorex® P, a product of Rexam, Inc.

Thus, the construction for awning fabrics illustrated in FIG. 1 includes a weatherable and decorative outer layer 14 over a smooth substrate layer 13 and is particularly useful for panels of an awning which are not reader panels. The fabric may be supplied in a variety of different colors. For white fabrics, a white decorative layer is adhered to the underlying translucent white substrate layer 13 to attain the requisite degree of opacity for a finished fabric.

A preferred fabric construction for awning reader panels which forms a part of the present invention is illustrated in FIGS. 2 and 3. In particular, with regard to FIG. 2, the outer decorative layer 14 for the nonreader panels is replaced with an outer transparent layer 15. The outer transparent layer 15 is weatherable and preferably is formed of extruded UT Tedlar® film including the UV-absorbing additives as discussed above. Because of the underlying translucent white substrate layer 13, the outer surface of the fabric is white in color and may be referred to as a "white base" fabric 17. This is to be distinguished from the white fabric discussed above, however, which includes an outer decorative layer 14 of pigmented white weatherable film.

Graphical material is then applied to the white base fabric. In particular, a decorative film 16 is provided having a pressure sensitive adhesive on one side thereof. After cutting, the decorative film 16 is then stuck to the outer transparent layer 15 of the white base fabric 17. The pressure sensitive decorative film 16 will typically be pigmented in a foreground color contrasting that of the adjoining panels or of the white base fabric 17 background. A preferred material for the decorative film 16 is SP Tedlar® PVF film which is available from the DuPont Company, Inc. with a pressure sensitive adhesive applied on one side thereof. As noted above, SP Tedlar® film includes pigments which block UV rays from passing therethrough to underlying layers, and is itself UV weatherable so that no protective weatherable layers need to be used over the graphics. The fabric 10 of FIG. 2 thus can be used as a reader panel exhibiting graphical matter in a foreground color (the decorative film 16) against a white background color (the translucent white substrate layer 13).

The white base fabric 17 illustrated in FIG. 2 is a desirable substrate fabric for aesthetic reasons. In particular, light colored graphics cannot be placed directly on top of darker background colors. Specifically, because the fabric will be backlit, the darker background color will show through the lighter foreground graphics and the graphics will not have the desired appearance at nighttime. Accordingly, it is preferred that the graphics be applied over a light colored background, and more particularly, a translucent white background such as provided by the base fabric 17 according to the present invention.

The construction of FIG. 2 is preferable for vertical reader panels wherein the rays of the sun strike the reader panel at a relatively low incident angle. For nonvertical applications, however, the white base fabric 17 may not be sufficiently UV resistant because of the UV absorbent outer transparent layer 15 which comprises the background portions of the white base fabric. As noted above, the UV-absorbing additives in the transparent layer break down over time and, in nonvertical applications, may break down too quickly for the fabric 17 to have sufficient durability.

FIG. 3 illustrates an awning fabric construction for reader panels which are not vertically oriented or where a background color other than white is desired. More particularly, portions of the outer transparent layer 15 which are not covered by the decorative film 16 (foreground color) are covered with a second decorative film 18 of the same material having the same UV blocking properties but exhibiting a contrasting background color. Thus, the entire surface of the reader panel is covered with a decorative and weatherable film which may be made up of one or more separately colored areas. Accordingly, the fabric of the present invention can be easily adapted for vertical or nonvertical applications while at the job site.

One particularly advantageous feature of the present invention is that the background areas may be colored exactly the same as the surrounding fabric panels. As discussed above, color matching between adjacent backlit panels can be quite difficult and colors which may appear the same on the surface may be quite different when backlit, depending in part on the overall opacity of the fabric. With the present invention, however, the background of the reader panel and the surrounding panels have the same structure with the exception of the additional transparent (and thus nonopaque) layer 15 in the reader panel. The translucent inner protective layer 12, reinforcing scrim layer 11 and polymeric substrate layer 13 are the same for both the reader and nonreader panels and thus have the same overall translucency. In addition, the second decorative film 18 of the reader panel fabric and the outer decorative layer 14 of the nonreader panel fabric are formed of the same material and thus can have exactly the same color. As such, the reader panels and surrounding nonreader panels have excellent color matching properties. In addition, the same white base substrate fabric is used as a common component of both the vertical and nonvertical reader panels and the nonreader panels, which increases economic efficiency.

That which is claimed is:

1. A decorative and translucent weatherable fabric for covering outdoor structures of the type which may be backlit, said fabric comprising:
    a reinforcing scrim layer;
    a translucent inner protective layer on one side of said reinforcing scrim layer, said layer being formed of a water resistant polymer;
    a translucent polymeric substrate layer on the opposite side of said reinforcing scrim layer;
    an outer transparent layer adhered to said substrate layer on the side of said substrate layer opposite said reinforcing scrim layer, said transparent layer including UV-absorbing additives for absorbing UV rays and protecting said substrate layer; and
    a pigmented decorative film overlying at least portions of said transparent layer in a predetermined graphical pattern.

2. A decorative weatherable fabric as defined in claim 1 including a pressure sensitive adhesive on one surface of said decorative film for adhering said film to said outer transparent layer.

3. A decorative weatherable fabric as defined in claim 1 wherein the pigments of said decorative film include pigments which prevent UV rays from passing therethrough to said transparent layer and said substrate layer.

4. A decorative weatherable fabric as defined in claim 1 wherein said substrate layer includes a polyvinylchloride polymer and said outer transparent layer includes a polyvinylfluoride polymer, said fabric further comprising a hydrolytically stable solvent adhesive between said substrate layer and said outer transparent layer for adhering said layers together.

5. A decorative weatherable fabric as defined in claim 1 wherein said translucent substrate layer is white in color and said decorative film includes pigments of a color other than white.

6. A decorative weatherable fabric as defined in claim 1 wherein said polymeric substrate layer is thicker than said inner protective layer.

7. A decorative weatherable fabric as defined in claim 6 wherein said polymeric substrate layer has a thickness of about 11 mils.

8. A decorative weatherable fabric as defined in claim 1 wherein said decorative film is a cast film.

9. A decorative and translucent weatherable fabric for covering outdoor structures of the type which may be backlit, said fabric comprising:
    a reinforcing scrim layer;
    a translucent inner protective layer on one side of said reinforcing scrim layer, said layer being formed of a water resistant polymer;
    a translucent polymeric substrate layer on the opposite side of said reinforcing scrim layer;
    a transparent layer adhered to said substrate layer on the side of said substrate layer opposite said reinforcing scrim layer; and
    a decorative layer comprising a first pigmented decorative film overlying certain portions of said transparent layer, and a second pigmented decorative film of a different color than said first film and overlying certain other portions of said transparent layer to thereby form a predetermined graphical pattern.

10. A decorative weatherable fabric as defined in claim 9 including a pressure sensitive adhesive adhering each of said films to said transparent layer.

11. A decorative weatherable fabric as defined in claim 9 wherein the pigments of said first and second decorative films include pigments which prevent UV rays from passing therethrough to said transparent layer and said substrate layer.

12. A decorative weatherable fabric as defined in claim 9 wherein said substrate layer includes a polyvinylchloride polymer and said transparent layer includes a polyvinylfluoride polymer, said fabric further comprising a hydrolytically stable solvent adhesive applied between said substrate layer and said transparent layer for adhering said layers together.

13. A decorative weatherable fabric as defined in claim 9 wherein said transparent layer includes UV-absorbing additives for absorbing UV rays and protecting said substrate layer.

14. A decorative weatherable fabric as defined in claim 9 wherein said inner protective layer is formed of a translucent white polyvinylchloride polymer.

15. A decorative weatherable fabric as defined in claim 9 wherein said polymeric substrate layer is white in color.

16. A decorative weatherable fabric as defined in claim 9 wherein said polymeric substrate layer is thicker than said inner protective layer.

17. A decorative weatherable fabric as defined in claim 9 wherein said polymeric substrate layer has a thickness of about 11 mils.

18. A decorative weatherable fabric as defined in claim 9 wherein said decorative films are cast films.

19. A decorative weatherable covering for outdoor structures, said covering comprising:
    a first section for exhibiting graphical matter comprising;
        a substrate layer;
        a transparent layer adhered to said substrate layer, said transparent layer including UV-absorbing additives for absorbing UV rays and protecting said substrate layer; and
        a pigmented decorative film overlying at least portions of said transparent layer in a predetermined graphical pattern; and
    a second section adjacent to said first section, said second section comprising;

a substrate layer; and
an outer pigmented decorative and weatherable layer overlying said substrate layer.

20. A decorative weatherable covering for outdoor structures as defined in claim 19 wherein said first section further comprises a first pigmented decorative film overlying certain portions of said transparent layer and a second pigmented decorative film of a different color and overlying certain other portions of said transparent layer to thereby form a predetermined graphical pattern.

21. A decorative weatherable covering for outdoor structures as defined in claim 20 wherein said outer decorative layer of said second section and one of said first and second pigmented films of said first section are of the same color, and the other of said pigmented films of said first section is of a different color.

22. A decorative weatherable covering for outdoor structures as defined in claim 19 wherein the pigments of said decorative film of said first section and said decorative layer of said second section include pigments which prevent UV rays from passing therethrough to said substrate layers.

23. A decorative weatherable covering for outdoor structures as defined in claim 19 wherein an edge portion of said first section and an edge portion of said second section are both affixed to a common structural member of the outdoor structure.

24. A process of forming a decorative weatherable fabric for covering outdoor structures, said process comprising the steps of:
adhering an outer transparent layer to one side of a polymeric substrate layer, the outer transparent layer including UV-absorbing additives for absorbing UV rays and protecting said substrate layer;
applying an inner protective layer formed of a water resistant polymer to one side of a reinforcing scrim layer;
applying the side of the polymeric substrate layer opposite the outer transparent layer to the side of the reinforcing scrim layer opposite the inner protective layer; and
applying a decorative film to at least portions of the transparent layer in a predetermined graphical pattern.

25. A process of forming a decorative weatherable fabric as defined in claim 24 wherein said adhering step further comprises applying a crosslinking adhesive between the outer transparent layer and the polymeric substrate layer to adhere the layers together.

26. A process of forming a decorative weatherable fabric as defined in claim 24 wherein said adhering step is performed at a first location.

27. A process of forming a decorative weatherable fabric as defined in claim 26 wherein said steps of applying the inner protective layer and the polymeric substrate layer to the reinforcing scrim layer further comprise applying a plastisol adhesive between the respective layers to adhere the layers together at a second location separate from the first location.

28. A process of forming a decorative weatherable fabric as defined in claim 24 wherein said step of applying a decorative film is performed at a third location separate from the first and second locations.

29. A process of forming a decorative weatherable fabric for covering outdoor structures, said process comprising the steps of:
adhering an outer transparent layer to one side of a polymeric substrate layer with a crosslinking adhesive at a first location, the outer transparent layer including UV-absorbing additives for absorbing UV rays and protecting said substrate layer;
rolling the transparent layer and substrate layer laminate into a roll form;
transporting the roll from the first location to a second location;
applying an inner protective layer formed of a water resistant polymer to one side of a reinforcing scrim layer at the second location;
applying the side of the polymeric substrate layer opposite the outer transparent layer to the side of the reinforcing scrim layer opposite the inner protective layer; and
applying a decorative film to at least portions of the transparent layer in a predetermined graphical pattern.

30. A process of forming a decorative weatherable fabric as defined in claim 29 wherein said steps of applying the inner protective layer and the polymeric substrate layer to the reinforcing scrim layer further comprise applying a plastisol adhesive between the respective layers to adhere the layers together.

31. A process of forming a decorative weatherable fabric as defined in claim 29 further comprising the step of transporting the substrate layer/scrim layer/protective layer laminate to a third location separate from the first and second locations before the step of applying a decorative film.

* * * * *